United States Patent
Ito et al.

(10) Patent No.: US 10,183,515 B2
(45) Date of Patent: Jan. 22, 2019

(54) PRINTING APPARATUS

(71) Applicant: BROTHER KOGYO KABUSHIKI KAISHA, Nagoya, Aichi (JP)

(72) Inventors: Naoto Ito, Aichi (JP); Junya Kawai, Kiyosu (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/708,656

(22) Filed: Sep. 19, 2017

(65) Prior Publication Data

US 2018/0207966 A1    Jul. 26, 2018

(30) Foreign Application Priority Data

Jan. 20, 2017   (JP) .................................. 2017-008720

(51) Int. Cl.
| | |
|---|---|
| B41J 29/38 | (2006.01) |
| B41J 3/407 | (2006.01) |
| G06K 7/10 | (2006.01) |
| B41J 11/00 | (2006.01) |
| B41J 15/04 | (2006.01) |

(52) U.S. Cl.
CPC ............. B41J 29/38 (2013.01); B41J 3/4075 (2013.01); B41J 11/0075 (2013.01); B41J 15/044 (2013.01); G06K 7/10366 (2013.01)

(58) Field of Classification Search
CPC ...... B41J 3/4075; B41J 29/38; B41J 11/0075; B41J 15/044
See application file for complete search history.

(56) References Cited

U.S. PATENT DOCUMENTS

| | | | |
|---|---|---|---|
| 8,554,958 B1 | 10/2013 | Weiser et al. | |
| 2008/0038034 A1* | 2/2008 | Yamaguchi | B41J 3/4075 |
| | | | 400/76 |
| 2009/0110417 A1 | 4/2009 | Homma et al. | |
| 2015/0246561 A1* | 9/2015 | Kawai | B41J 15/00 |
| | | | 347/16 |

FOREIGN PATENT DOCUMENTS

| | | |
|---|---|---|
| GB | 2350220 A | 11/2000 |
| JP | 2000-270129 A | 9/2000 |
| JP | 2009-134278 A | 6/2009 |

* cited by examiner

*Primary Examiner* — Geoffrey S Mruk
*Assistant Examiner* — Scott A Richmond
(74) *Attorney, Agent, or Firm* — Scully, Scott, Murphy & Presser, P.C.

(57) ABSTRACT

A printing apparatus, having a cassette, an attachable section, a printer, and a controller, is provided. The controller is configured to determine whether a medium remainder in a first cassette is equal to a predetermined amount; execute a reading action to read specific data from a first-typed memory device in the first cassette and store the specific data in a second-typed memory device, delete the specific data from the first-typed memory device in the first cassette; determine whether a second cassette being another cassette attached to the attachable section after execution of the reading action is a new cassette, in which the medium remainder is greater than the predetermined amount and in which the specific data is not stored in the first-typed memory device; and execute a writing action to write the specific data stored in the second-typed memory device to the first-typed memory device in the second cassette.

10 Claims, 8 Drawing Sheets

PRINTING APPARATUS

CROSS REFERENCE TO RELATED APPLICATION

This application claims priority from Japanese Patent Application No. 2017-008720, filed on Jan. 20, 2017, the entire subject matter of which is incorporated herein by reference.

BACKGROUND

Technical Field

An aspect of the present disclosure is related to a printing apparatus.

Related Art

A printing apparatus for printing an image in a printing medium, which is stored in a replaceable cassette, is known. For example, a printing apparatus with a toner cartridge containing toner and having a memory device is known. The printing apparatus may obtain data from the memory device in the toner cartridge and print an image based on the obtained data.

SUMMARY

The printing apparatus with the replaceable toner cartridge may require replacement of the used toner cartridge with a new toner cartridge when the toner in the former toner cartridge is exhausted. After the replacement, a user may wish to continuously use the data, which is stored in the memory device in the former toner cartridge, with the new toner cartridge after the replacement. Meanwhile, relaying the data from the memory device in the former toner cartridge to the new toner cartridge to be used continuously in the new toner cartridge may not have been easy.

The present disclosure is advantageous in that a printing apparatus, in which data stored in a memory device to be used with one cassette may be continuously used with another cassette, is provided.

According to an aspect of the present disclosure, a printing apparatus, including a cassette configured to store a printing medium therein, the cassette including a first-typed memory device, the first-typed memory device being configured to store data therein; an attachable section, to which the cassette is detachably attachable; a printer configured to print an image in conjunction with the cassette attached to the attachable section; and a controller configured to determine whether a medium remainder indicating a remaining amount of the printing medium in a first cassette is equal to a predetermined amount, the first cassette being the cassette attached to the attachable section and having been used for printing in conjunction with the printer; based on a determination that the medium remainder in the first cassette is equal to the predetermined amount, execute a reading action to read specific data from the first-typed memory device in the first cassette and store the specific data in a second-typed memory device, the second-typed memory device being configured to store data therein; after reading the specific data from the first-typed memory device in the first cassette, delete the specific data from the first-typed memory device in the first cassette; after execution of the reading action, determine whether a second cassette being another cassette attached to the attachable section after the execution of the reading action is a new cassette, in which the medium remainder is greater than the predetermined amount and in which the specific data is not stored in the first-typed memory device; and based on a determination that the second cassette is the new cassette, execute a writing action to write the specific data stored in the second-typed memory device into the first-typed memory device in the second cassette, is provided.

According to another aspect of the present disclosure, a printing apparatus, including a cassette configured to store a printing medium therein, the cassette including a first-typed memory device, the first-typed memory device being configured to store data therein; an attachable section, to which the cassette is detachably attachable; a printer configured to print an image in conjunction with the cassette attached to the attachable section; and a controller configured to determine whether a medium remainder indicating a remaining amount of the printing medium in a first cassette is equal to a predetermined amount, the first cassette being the cassette attached to the attachable section and having been used for printing in conjunction with the printer; based on a determination that the medium remainder is equal to the predetermined amount, determine whether the controller received a read command, the read command being a command to the controller to execute a reading action to read specific data from the first-typed memory device in the first cassette and store the specific data in a second-typed memory device, the second-typed memory device being configured to store data therein; based on a determination that the controller received the read command, execute the reading action; after reading the specific data from the first-typed memory device in the first cassette, delete the specific data from the first-typed memory device in the first cassette; after execution of the reading action, determine whether the controller received a write command, the write command being a command to the controller to execute a writing action to write the specific data stored in the second-typed memory device into the first-typed memory device in a second cassette, the second cassette being another cassette attached to the attachable section after the execution of the reading action; and based on a determination that the controller received the write command, execute the writing action, is provided.

According to another aspect of the present disclosure, a printing apparatus, including an attachable section, to which a cassette configured to store a printing medium therein and including a first-typed memory device is attachable, the first-typed memory device being configured to store data; a printer configured to print an image in conjunction with the cassette attached to the attachable section; and a controller configured to determine whether a medium remainder indicating a remaining amount of the printing medium in a first cassette is equal to a predetermined amount, the first cassette being the cassette attached to the attachable section and having been used for printing in conjunction with the printer; based on a determination that the medium remainder in the first cassette is equal to the predetermined amount, execute a reading action to read specific data from the first-typed memory device in the first cassette and store the specific data in a second-typed memory device, the second-typed memory device being configured to store data therein; after reading the specific data from the first-typed memory device in the first cassette, delete the specific data from the first-typed memory device in the first cassette; after execution of the reading action, determine whether a second cassette being another cassette attached to the attachable section after the execution of the reading action is a new cassette, in which the medium remainder is greater than the predetermined amount and in which the specific data is not stored in the first-typed memory device; and based on a determination that the second cassette is the new cassette, execute a writing action to write the specific data stored in the second-typed memory device to the first-typed memory device in the second cassette, is provided.

According to another aspect of the present disclosure, a printing apparatus, including an attachable section, to which a cassette configured to store a printing medium therein and including a first-typed memory device is attachable, the first-typed memory device being configured to store data; a printer configured to print an image in conjunction with the cassette attached to the attachable section; and a controller configured to determine whether a medium remainder indicating a remaining amount of the printing medium in a first cassette is equal to a predetermined amount, the first cassette being the cassette attached to the attachable section and having been used for printing in conjunction with the printer; based on a determination that the medium remainder is equal to the predetermined amount, determine whether the controller received a read command, the read command being a command to the controller to execute a reading action to read specific data from the first-typed memory device in the first cassette and store the specific data in a second-typed memory device, the second-typed memory device being configured to store data therein; based on a determination that the controller received the read command, execute the reading action; after reading the specific data from the first-typed memory device in the first cassette, delete the specific data from the first-typed memory device in the first cassette; after execution of the reading action, determine whether the controller received a write command, the write command being a command to the controller to execute a writing action to write the specific data stored in the second-typed memory device into the first-typed memory device in a second cassette, the second cassette being another cassette attached to the attachable section after the execution of the reading action; and based on a determination that the controller received the write command, execute the writing action, is provided.

DETAILED DESCRIPTION

A printing apparatus 1 according to a first embodiment of the present disclosure will be described below with reference to the accompanying drawings. The printing apparatus 1 may print text including characters, e.g., symbols, numeric signs, figures, icons, etc., on a strip of tape 50 (see FIG. 2) to produce labels. The tape 50 may be a non-thermosensitive receptor-typed material. In the following description, concerning orientation of the image forming apparatus 1, a viewer's upper-right side, a lower-left side, a lower-right side, an upper-left side, an upper side, and a lower side shown in FIG. 1 will be referred to as a rightward side, a leftward side, a frontward side, a rearward side, an upper side, and a lower side of the image forming apparatus 1, respectively.

Figure 1:
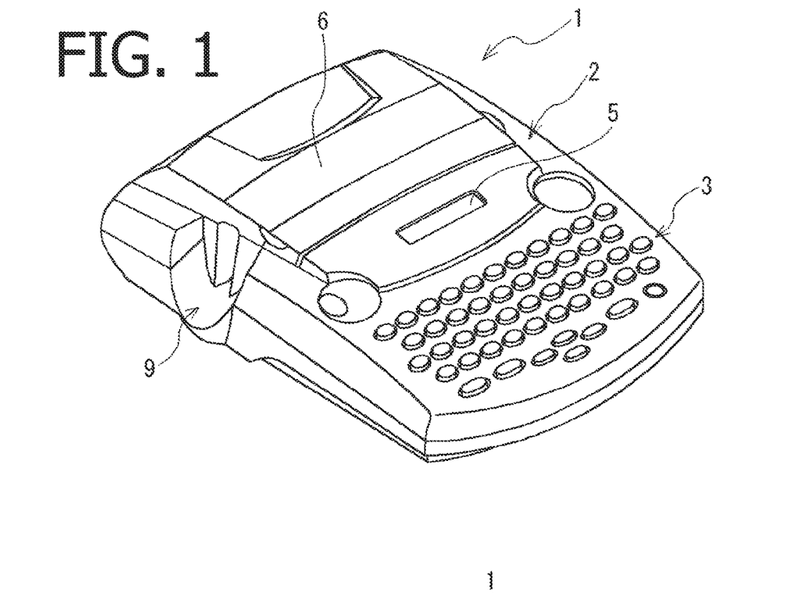
FIG. 1 is a perspective view of a printing apparatus according to a first embodiment of the present disclosure.
Figure 2:
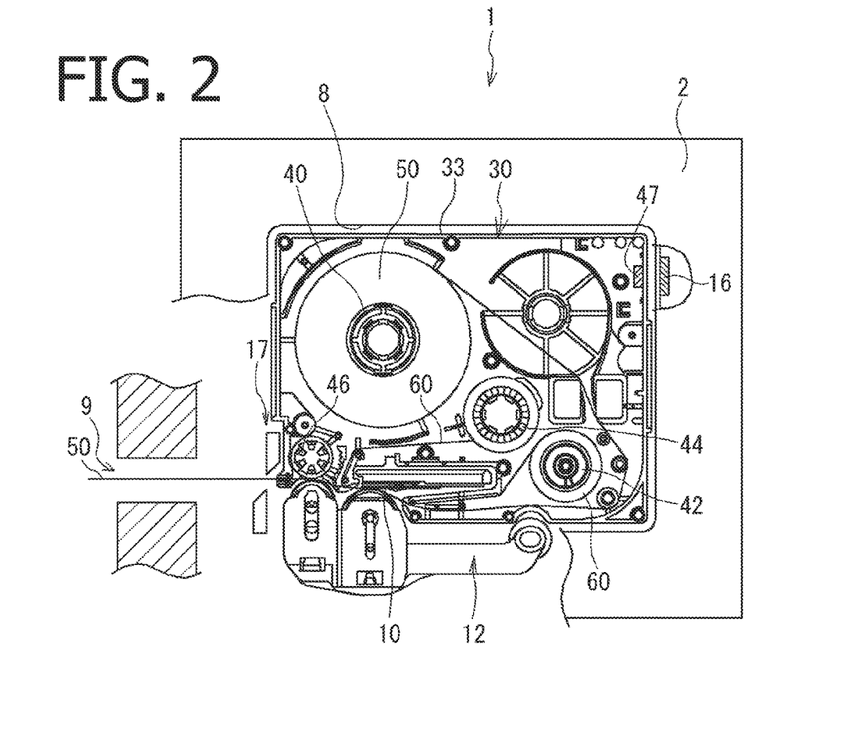
FIG. 2 is a partial plan view of the printing apparatus with a cassette cover being open according to the first embodiment of the present disclosure.

Referring to FIGS. 1 and 2, a mechanical configuration of the printing apparatus 1 will be described below. As shown in FIG. 1, the printing apparatus 1 includes a main cover 2 being a housing that has an approximately rectangular shape. In a frontward area on an upper surface of the main cover 2, arranged is a keyboard 3, through which characters may be input. The keyboard 3 may include, for example, a power switch, function keys, and cursor keys. In a rearward position from the keyboard 3, arranged is a display 5, in which characters to print may be displayed. In a rearward area from the display 5, arranged is a cassette cover 6, which is openable/closable with respect to the main cover 2. In a rearward position on a leftward face of the main cover 2, arranged is a tape outlet 9. The tape outlet 9 is an opening, through which the tape 50 with characters printed thereon may be ejected.

As shown in FIG. 2, inside the main cover 2, underneath the cassette cover 6 (see FIG. 1), arranged is an attachable section 8. The attachable section 8 is formed to dent in a shape to accommodate a tape cassette 30 so that the tape cassette 30 may be detachably attached thereto. In the following description, the tape cassette 30 attached to the attachable section 8 will be referred to as an attached tape cassette 30. In conjunction with the attached tape cassette 30, the printing apparatus 1 may print characters that are input through the keyboard 3 on the tape 50.

The tape cassette 30 includes a cassette casing 33 being a housing formed in an approximately rectangular shape. The cassette casing 33 accommodates an ink ribbon 60, which may be used to print the characters on the tape 50. In a leftward-rear area in the tape cassette 30, rotatably supported is a tape spool 40, around which the tape 50 in an unused condition may be wound. In a rightward-front area in the tape cassette 30, rotatably supported is a ribbon spool 42, around which the ink ribbon 60 in an unused condition may be wound. In a position between the tape spool 40 and the ribbon spool 42, rotatably supported is a ribbon-collector spool 44. The ribbon-collector spool 44 may draw the unused ink ribbon 60 from the ribbon spool 42 and wind the ink ribbon 60 in a used condition there-around. At a leftward-front corner in the tape cassette 30, rotatably supported is a tape-driving roller 46, which may draw the unused tape 50 from the tape spool 40. The tape cassette 30 includes an IC tag 47, which is arranged at a rightward-rear corner in the cassette casing 33.

The IC tag 47 may store various types of data including specific data and tape remainder flag. In particular, the IC tag 47 may store print data, including numbering data, as the specific data. The numbering data may refer to values corresponding to a specific consecutive pattern of characters that may be updated sequentially in compliance with the consecutive pattern. In the following description, the characters in the consecutive pattern that may be updated sequentially may be referred to as numbering characters, and the values corresponding to the numbering characters may be referred to as numbering values. The numbering characters may include numeric figures and alphabets including foreign alphabets such as Japanese kana. For example, a numbering value "1" may correspond to "1" in numeric figures or to "A" in alphabet. For another example, a numbering value "2" may correspond to "2" in numeric figures or to "B" in alphabet. The specific data may be a set of data, based on which a numbering character corresponding to the numbering value may be printed. The specific data may be used in a numbered printing operation, which will be described later. The tape remainder flag may indicate a medium remainder, i.e., a remaining amount of the tape 50, in the tape cassette 30 is equal to a predetermined amount. For example, the tape remainder flag may indicate whether the medium remainder is none, or zero (0). The tape remainder flag may be initially set to "on" while the tape cassette 30 has a substantial amount of tape 50, and when the medium remainder is lowered to zero, the remainder flag may be turned "off."

Figure 3:
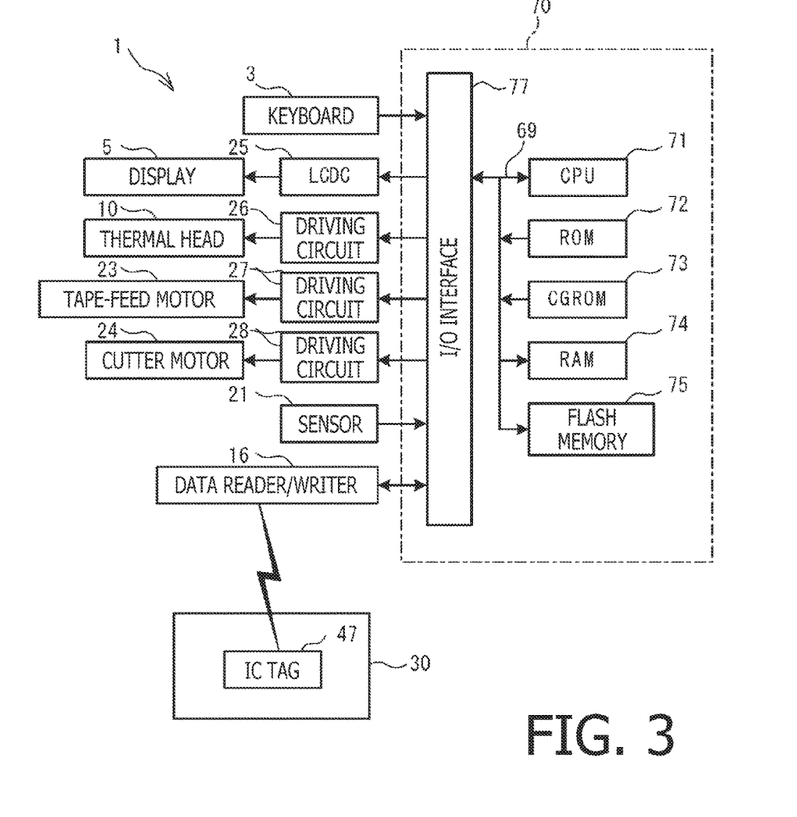
FIG. 3 is a block diagram to illustrate an electrical configuration of the printing apparatus according to the first embodiment of the present disclosure.

In the attachable section 8, arranged are a ribbon-collector shaft (not shown), a tape-driver shaft (not shown), a thermal head 10, a platen 12, a data reader/writer 16, and a sensor 21 (FIG. 3). The ribbon-collector shaft is inserted through the ribbon-collector spool 44 and is rotatable by a driving force from a tape-feed motor 23 (see FIG. 3). The tape-driver shaft is inserted through the tape-driver roller 46 and is rotatable by the driving force from the tape-feed motor 23 through a transmission (not shown). The thermal head 10 is arranged on a rightward side of the tape-driver shaft and may print characters on the tape 50 being conveyed in conjunction with the unused ink ribbon. The platen 12 may, together with the thermal head 10, press the tape 50 and the ink ribbon 60 against each other and convey the tape 50 and the ink ribbon 60 integrally.

The data reader/writer 16 is arranged in a rightward-rear area in the attachable section 8 at a position to coincide with the IC tag 47 in the attached tape cassette 30 across a right-side wall of the cassette casing 33. The data reader/writer 16 may write and read data to and from the IC tag 47 in the attached tape cassette 30 in RFID technology.

The sensor 21 may detect the medium remainder in the attached tape cassette 30 being lowered to zero. The sensor 21 may be a known optical sensor having a light emitter and a light receiver. The sensor 21 may detect an end mark (not shown), which is printed in black in advance on the tape 50 in the tape cassette 30. The end mark may be printed, for example, at a position distanced apart from an end of the tape 50 for a predetermined length. The sensor 21 may emit light from the light emitter at the tape 50 and receive the light reflected on the tape 50 by the light receiver. Based on intensity of the received light, the sensor 21 may detect the end mark. The sensor 21 may be located at a position to face a window (not shown) formed in the tape cassette 30 so that the sensor 21 may detect the end mark through the window.

A cutter assembly 17 may be arranged in vicinity of the tape outlet 9. The cutter assembly 17 may be driven by a driving force from a cutter motor 24 (see FIG. 3) to cut the tape 50 at a predetermined position.

An electrical configuration of the printing apparatus 1 will be described below with reference to FIG. 3. The printing apparatus 1 includes a controller circuit unit 70. The controller circuit unit 70 is mounted on a controller board (not shown) and includes a CPU 71, a ROM 72, a CGROM 73, a RAM 74, a flash memory 75, and an input/output (IO) interface 77, which are connected with one another through a data bus 69.

The CPU 71 may control overall acts in the printing apparatus 1. The ROM 72 may store various types of parameters that are required for programs to be executed by the CPU 71. The CGROM 73 may store printable dot pattern data, which is required to print characters. The RAM 74 contains a plurality of memory areas including a text memory and a printer buffer. The flash memory 75 may store the programs to be executed by the CPU 71 to control the printing apparatus 1.

The 10 interface 77 is connected with the keyboard 3, a liquid crystal driving circuit (LCDC) 25, driving circuits 26, 27, 28, the sensor 21, and the data reader/writer 16. The LCDC 25 includes a video RAM (not shown), which may be used to output data to the display 5. The driving circuit 26 is an electric circuit to drive the thermal head 10. The driving circuit 27 is an electric circuit to drive the tape-feed motor 23. The driving circuit 28 is an electric circuit to drive the cutter motor 24.

The numbered printing operation will be described in this paragraph. The printing apparatus 1 may conduct the numbered printing operation, in which the numbering characters may be updated sequentially according to the predetermined pattern and the updated numbering characters may be printed. Prior to starting the numbered printing operation, a user designates a number for a numbering count. The numbering count starting from the designated number may be updated, i.e., decremented, as the numbering value is incremented by one (1) until the numbering count is lowered to zero (0). The numbered printing operation ends when the numbering count reaches the number designated by the user. For example, if an initial numbering value is "1," and when the user designates the number for the numbering count to be "3," and alphabet is designated as the numbering characters, three alphabet letters "A," "B," and "C" may be printed sequentially.

Figure 4:
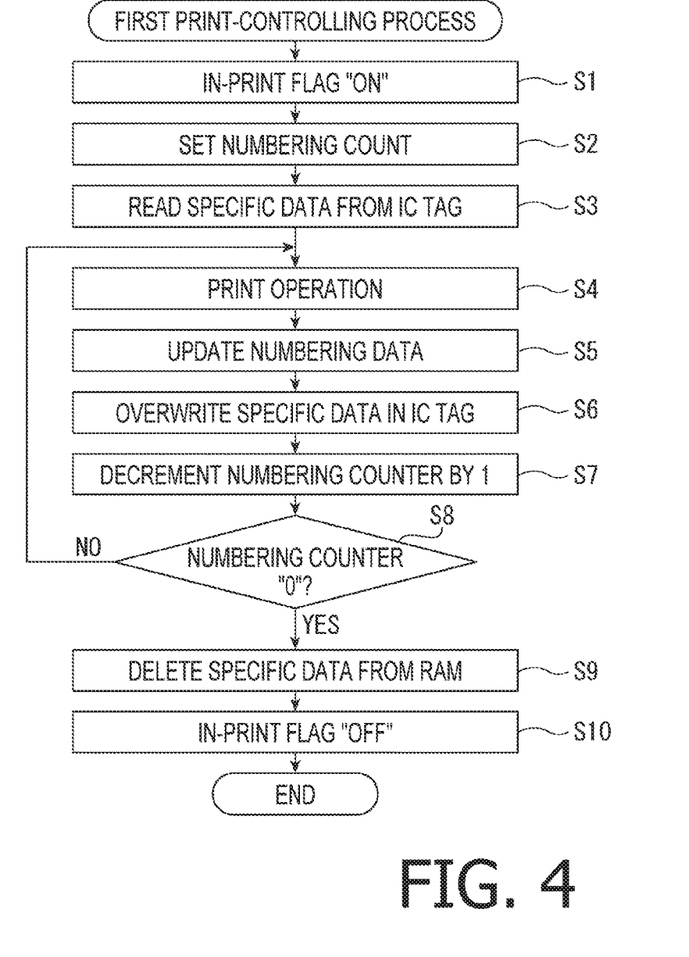
FIG. 4 is a flowchart to illustrate a first print-controlling process to be conducted in the printing apparatus according to the first embodiment of the present disclosure.

In the following paragraphs, a first print-controlling process to be executed by the CPU 71 to control the numbered printing operation will be described below with reference to FIG. 4. As a user operates the keyboard 3 to input a numbered printing start command, i.e., a command for starting a numbered printing operation, the CPU 71 activates and executes the first print-controlling process according to a program stored in the flash memory 75. The numbered printing start command includes data that designates the number for the numbering count. Meanwhile, the tape cassette 30 should be attached to the attachable section 8 prior to input of the numbered printing start command. When the tape cassette 30 is attached to the attachable section 8, the CPU 71 becomes ready to exchange data with the IC tag 47 in the attached tape cassette 30 through the data reader/writer 16.

In S1, the CPU 71 sets an in-print flag, which indicates that the first print-controlling process is in progress in the printing apparatus 1, "on." In S2, the CPU 71 sets the number for the numbering count designated in the numbered printing start command at a number counter prepared in the RAM 74. In S3, the CPU 71 manipulates the data reader/writer 16 to read specific data, i.e., print data including the numbering data, from the IC tag 47 of the attached tape cassette 30. The specific data read from the IC tag 47 is stored in the RAM 74.

In S4, the CPU 71 prints a current numbering character corresponding to the current numbering value indicated in the numbering data based on the specific data, i.e., the print data, stored in the RAM 74. Specifically, the tape-feed motor 23 is driven through the driving circuit 27 to control conveyance of the tape 50 and the ink ribbon 60. Meanwhile, the thermal head 10 is driven in synchronization with the control on the tape-feed motor 23. Thus, the current numbering character corresponding to the numbering value is printed on the tape 50 being conveyed in conjunction with the ink ribbon 60. In the following description, the tape cassette 30 being attached to the attachable section 8 and having been used to print the character in conjunction with the thermal head 10 may be referred to as a first cassette. Upon completion of printing the current numbering character corresponding to the current numbering value, the CPU 71 ends the printing process in S4.

In S5, the CPU 71 increments the numbering value by one to update the numbering data, i.e., the specific data, stored in the RAM 74. In S6, the CPU 71 manipulates the data reader/writer 16 to write the specific data updated and stored in the RAM 74 over the specific data stored in the IC tag 47 in the first cassette. Thus, the specific data, i.e., the numbering data, stored in the IC tag 47 in the first cassette is updated. Therefore, in a next first print-controlling process, in S3, the printing apparatus 1 may read the specific data from the IC tag 47 in the first cassette and print a numbering character corresponding to an updated numbering value that follows the numbering value used in the previous printing process.

In S7, the CPU 71 decrements the value in the numbering counter by one. In S8, the CPU 71 determines whether the value in the numbering counter is zero. If the value in the numbering counter is determined not to be zero (S8: NO), the CPU 71 returns to S4 and repeats the flow from S4 through S7 until the value in the numbering character indicates zero. Therefore, each time a numbering character is printed, a next numbering character corresponding to a numbering value incremented by one from a previous printing process (S4) is printed. For example, for the numbering characters in alphabet, "A," "B," "C" . . . may be printed sequentially each time the flow from S4-S7 is repeated. When the numbering counter indicates zero (S8: YES), in S9, the CPU 71 deletes the specific data from the RAM 74. In S10, the CPU 71 sets the in-print flag "off" and ends the first print-controlling process.

Figure 5:
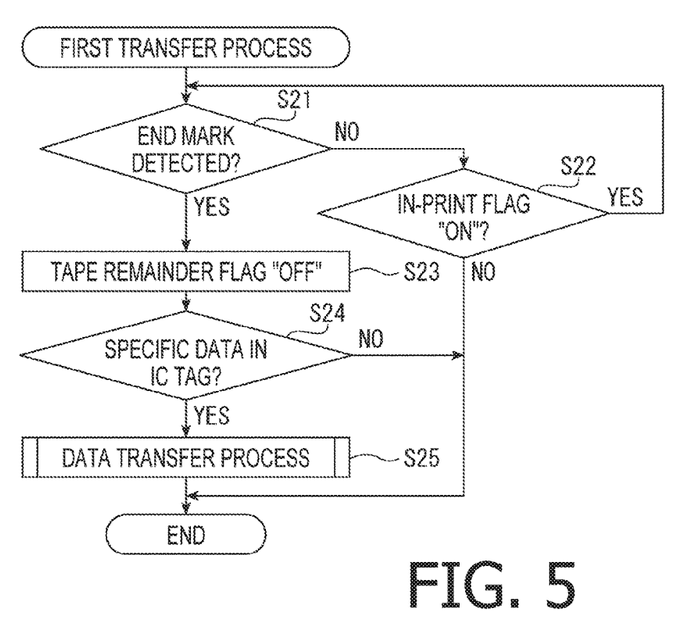
FIG. 5 is a flowchart to illustrate a first transfer process to be conducted in the printing apparatus according to the first embodiment of the present disclosure.
Figure 6:
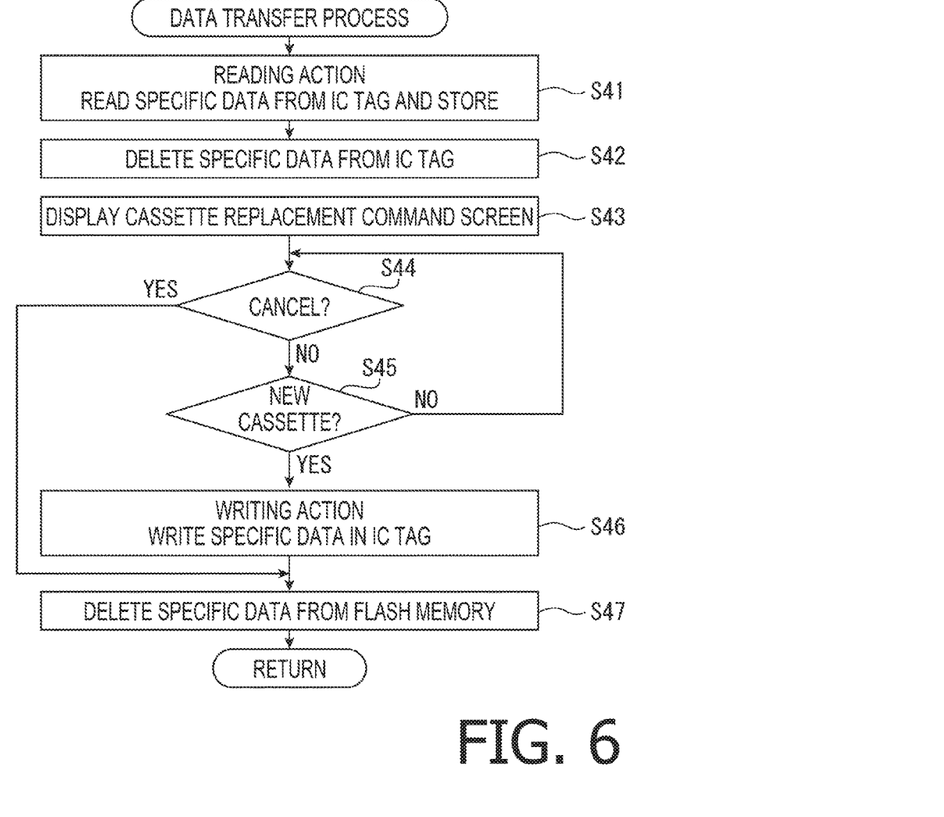
FIG. 6 is a flowchart to illustrate a data transfer process to be conducted in the printing apparatus according to the first embodiment of the present disclosure.

With reference to FIGS. 5 and 6, a first transfer process to be executed by the CPU 71 will be described below. As the user operates the keyboard 3 to input the numbered printing start command to the CPU 71, the CPU 71 executes the first transfer process according to a program stored in the flash memory 75. In this regard, when the numbered printing start command is input to the CPU 71, the first transfer process and the first print-controlling process (see FIG. 4) are executed in parallel in multitasking.

As shown in FIG. 5, in S21, the CPU 71 determines, based on an intensity of the light detected by the sensor 21, whether the end mark printed on the tape 50 was detected. In other words, the CPU 71 determines whether the medium remainder in the first cassette is lowered to be equal to a predetermined amount. If no end mark was detected (S21: NO), in S22, the CPU 21 determines whether the in-print flag is "on." If the in-print flag is "on" (S22: YES), the CPU 71 returns to S21 and determines whether the end mark printed on the tape 50 was detected. If the in-print flag is "off" (S22: NO), the CPU 71 ends the first transfer process. In S21, if the end mark was detected (S21: YES), in S23, the CPU 71 sets the tape remainder flag in the IC tag 47 in the first cassette "off" through the data reader/writer 16.

In S24, the CPU 71 determines, through the data reader/writer 16, whether the specific data is stored in the IC tag 47 in the first cassette. If no specific data is stored in the IC tag 47 in the first cassette (S24: NO), the CPU 71 ends the first transfer process. If the specific data is stored in the IC tag 47 in the first cassette (S24: YES), in S25, the CPU 71 executes a data transfer process (see FIG. 6) and thereafter ends the first transfer process.

With reference to FIG. 6, the data transfer process will be described below. In the data transfer process, the specific data, i.e., the print data including the numbering data, may be transferred from the IC tag 47 in the first cassette to an IC tag 47 in a second cassette, which will be described later in detail, through the flash memory 75. In S41, the CPU 71 executes a reading action. Specifically, the CPU 71 manipulates the data reader/writer 16 to read the specific data from the IC tag 47 in the first cassette. The CPU 71 stores the specific data read from the IC tag 47 in the flash memory 75. In S42, following the execution of the reading action in S41, the CPU 71 deletes the specific data from the IC tag 47 in the first cassette through the data reader/writer 16.

In S43, the CPU 71 displays a cassette replacement command screen in the display 5. The cassette replacement command screen may prompt the user to replace the first cassette, in which the medium remainder is zero, with another tape cassette 30. Through the cassette replacement command screen, the user may command to cancel the replacement of the tape cassettes 30.

In S44, the CPU 71 determines whether cancellation of the tape replacement is commanded through the keyboard 3. If the cancellation is commanded (S44: YES), in S47, the CPU 71 deletes the specific data from the flash memory 75. In this regard, the specific data is deleted both from the IC tag 47 in the first cassette and from the flash memory 75 in S42, S47, respectively. For example, the user may wish not to use the specific data in the IC tag 47 continuously from the first cassette. In such a case, the user may command to cancel transfer of the specific data from the IC tag 47 in the first cassette to the IC tag 47 in the replacing tape cassette 30. With the cancellation command, the specific data not to be transferred is deleted; therefore, the specific data not to be used continuously may be restrained from being transferred to the IC tag 47 in another tape cassette 30, and confidentiality of the data may be secured.

Meanwhile, if the user does not command to cancel the data transfer but wishes to use the specific data continuously over the tape replacement, the user may replace the attached tape cassette 30 with another tape cassette 30. In other words, if the tape 50 in the first cassette is used to the end, the user may replace the first cassette with an unused tape cassette 30. In the following description, the replacing tape cassette 30, which is attached to the attachable section 8 after the reading action in S41, will be referred to as the second cassette.

In S44, if no cancellation is commanded (S44: NO), in S45, the CPU 71 determines whether the second cassette is a new cassette, in which the medium remainder is greater than zero, and in which the IC tag 47 stores no specific data, through the data reader/writer 16. The new cassette may be, for example, an unused tape cassette 30. If the tape remainder flag is "on," and no specific data is stored in the IC tag 47 in the second cassette, the CPU 71 determines that the second cassette is a new cassette. If the second cassette is not a new cassette (S45: NO), the CPU 71 repeats S44-S45 until either cancellation is commanded or a new cassette is attached to the attachable section 80.

If the second cassette is a new cassette (S45: YES), in S46, the CPU 71 executes a writing action. Specifically, the CPU 71 writes the specific data stored in the flash memory 75 into the IC tag 47 in the second cassette. In S47, following the execution of the writing action in S46, the CPU 71 deletes the specific data from the flash memory 75 and returns to the first transfer process (see FIG. 5).

As described above, when the medium remainder is lowered to be equal to the predetermined amount, e.g., none (zero), (S21: YES), in S41, the reading action is automatically performed to the first cassette, and the specific data read from the IC tag 47 in the first cassette is stored in the flash memory 75. If the first cassette with the medium reminder being equal to the predetermined amount is replaced with the second cassette, in S45, the CPU 71 determines whether the second cassette is a new cassette. If the second cassette is determined to be a new cassette (S45: YES), in S46, the writing action is automatically performed to the second cassette, and the specific data stored in the flash memory 75 is written into the IC tag 47 in the second cassette. Thus, the specific data having been used with the first cassette being the former replaced tape cassette 30 may be stored in the IC tag 47 in the latter replacing second cassette. In this regard, after the medium remainder in the first cassette is lowered to the predetermined amount, and the first cassette is replaced with the second cassette, the user may use the specific data continuously over the replacement. Therefore, the user may use the printing apparatus 1 in conjunction with the specific data inherited from the IC tag 47 in the replaced tape cassette 30 with the replacing tape cassette 30.

Specifically, according to the printing apparatus 1 in the first embodiment, the print data including the numbering data as the specific data may be transferred from the IC tag 47 in the first cassette to the IC tag 47 in the second cassette. For example, if the medium remainder is lowered to the predetermined amount while the numbered printing operation is being executed, the print data including the numbering data that indicates the current numbering value may be transferred from the IC tag 47 in the first cassette, in which the medium remainder is equal to the predetermined amount, to the IC tag 47 in the second cassette being a new cassette. Therefore, when the numbered printing operation is inherited to the second cassette, the printing apparatus 1 may resume counting the numbering values from the latest count, up to which the numbering value reached in the first cassette. In other words, after replacing the first cassette, in which the medium remainder is equal to the predetermined amount, with the second cassette, the numbered printing operation may be resumed with the second cassette from the numbering character which immediately follows the latest numbering character printed in the numbered printing operation performed in conjunction with the first cassette in compliance with the consecutive pattern of the numbering characters. Thus, the user may manage the print data including the numbering data easily.

When the medium remainder is equal to zero, the reading action may be automatically executed; and when the first cassette is replaced with a new cassette, the writing action may be automatically executed in conjunction with the new cassette. Therefore, when the medium remainder is lowered to zero, the user may only replace the first cassette with the new cassette to transfer the specific data from the IC tag 47 in the first cassette being the used and replaced tape cassette 30 to the new cassette being the replacing tape cassette 30. In this regard, the printing apparatus 1 may reduce the load on the user who may unless otherwise operate the printing apparatus 1 to manually transfer the specific data from the IC tag 47 in the replaced tape cassette 30 to the IC tag 47 in the replacing tape cassette 30.

Following the reading action to read the specific data from the IC tag 47 in the first cassette in S41, in S42, the specific data is deleted from the IC tag 47 in the first cassette. In this regard, the specific data may be restrained from being stored in multiple IC tags 47 in multiple tape cassettes 30. Thus, the printing apparatus 1 may connect the specific data to a single tape cassette 30 and prevent the specific data from spreading, and the specific data may be managed easily.

Following the writing action to write the specific data from the flash memory 75 to the IC tag 47 in the second cassette in S46, in S47, the specific data is deleted from the flash memory 75. In this regard, the printing apparatus 1 may prevent the specific data from shared by multiple IC tags 47 in multiple tape cassette 30 and may prevent the specific data from spreading.

While the tape 50 is accommodated in the cassette casing 33, the tape 50 may be prevented from being damaged while the tape cassettes 30 are replaced.

When the medium remainder is lowered to zero in S21 (S21: YES), in S41, the reading action is executed. Therefore, the printing apparatus 1 may read the specific data from the IC tag 47 in the first cassette, in which the tape 50 is exhausted. When the tape 50 is exhausted, that is, when the medium remainder is equal to zero, the user may replace the first cassette with a new cassette. In this regard, the printing apparatus 1 may transfer the specific data from the IC tag 47 in the replaced tape cassette 30 to the IC tag 47 in the replacing tape cassette 30.

Figure 7:
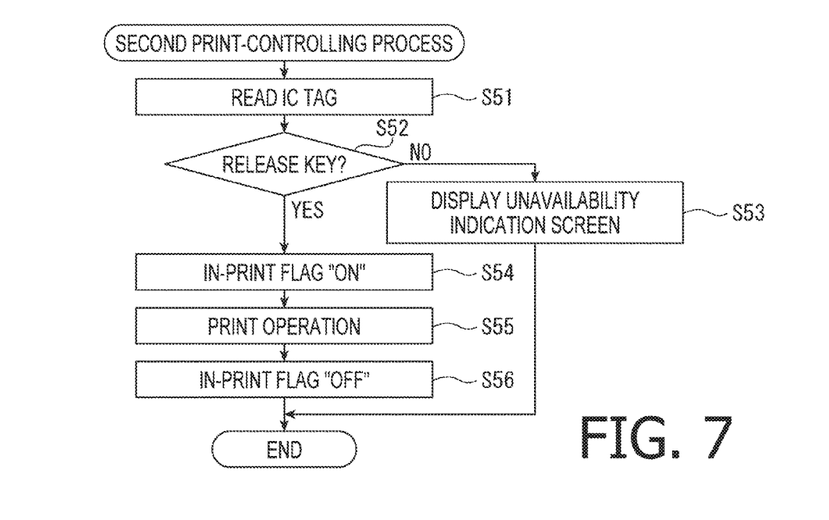
FIG. 7 is a flowchart to illustrate a second print-controlling process to be conducted in the printing apparatus according to a second embodiment of the present disclosure.

Next, with reference to FIGS. 7 and 8, a second embodiment of the present disclosure will be described in the following paragraphs below. In the following description, items or structures which are the same as or similar to the items or the structure described in the previous embodiment will be referred to by the same reference signs, and description of those will be omitted. In particular, the mechanical configuration (see FIGS. 1 and 2) and the electrical configuration (see FIG. 3) of the printing apparatus 1 in the second embodiment may be similar to those in the printing apparatus in the previous embodiment. Meanwhile, the printing apparatus 1 in the second embodiment is different from the printing apparatus 1 in the first embodiment in that the IC tag 47 in the tape cassette 30 may store a release key as the specific data. The release key may be a set of data that indicates that the tape cassette 30 is released from usage restriction. For example, the printing apparatus 1 may print characters on the tape 50 in the tape cassette 30 when the IC tag 47 in the tape cassette 30 contains the release key, that is, when the tape cassette 30 is released from the usage restriction. On the other hand, when the IC tag 47 in the tape cassette 30 does not contain the release key, that is, when usage of the tape cassette 30 is restricted, the printing apparatus 1 may not print characters on the tape 50 in the tape cassette 30.

A second print-controlling process, which may be conducted in place of the first print-controlling process (see FIG. 4), will be described below with reference to FIG. 7. As a user operates the keyboard 3 to input a printing start command, i.e., a start command for starting a printing operation, the CPU 71 executes the second print-controlling process according to a program stored in the flash memory 75.

In S51, the CPU 71 reads data from the IC tag 47 in the attached tape cassette 30 through the data reader/writer 16. In S52, the CPU 71 determines whether the data read from the IC tag 47 in the attached tape cassette 30 contains the release key being the specific data. If no release key is stored in the IC tag 47 (S52: NO), in S53, the CPU 71 displays an unavailability indication screen in the display 5. The unavailability indication screen may include an image to notify the user that printing in conjunction with the attached tape cassette 30 is unavailable. Optionally or additionally, the CPU 71 may notify the user that printing in conjunction with the attached tape cassette 30 is unavailable by aurally or visually, for example, by outputting an alert sound or turning an error lamp on. Thus, the user may recognize that the IC tag 47 in the attached tape cassette 30 does not store the release key. The CPU 71 ends the second print-controlling process.

Meanwhile, if the IC tag 47 stores the release key (S52: YES), in S54, the CPU 71 sets the in-print flag "on." In S55, the CPU 71 controls a printing action. Following the printing action, in S56, the CPU 71 sets the in-print flag "off" and ends the second print-controlling process.

Meanwhile, the first transfer process (see FIGS. 5 and 6) described in the first embodiment may be similarly conducted in the second embodiment. As the user operates the keyboard 3 to input the print start command to the CPU 71, the CPU 71 executes the first transition process according to the program stored in the flash memory 75. In this regard, when the print start command is input to the CPU 71, the first transfer process and the second print-controlling process (see FIG. 7) are executed in parallel in multitasking. The steps in the first transfer flow in the second embodiment, which may be similar to those in the first embodiment, will be briefly described below.

As shown in FIG. 5, the CPU 71 may detect the end mark in S21 (S21: YES), execute the processes in S23-24 (S23, S24: YES), and execute the data transfer process (see FIG. 6) in S25. As shown in FIG. 6, the CPU 71 may execute the reading action in S41. Specifically, the CPU 71 may read the release key being the specific data from the IC tag 47 in the first cassette through the data reader/writer 16. In S42, the CPU 71 may store the release key read from the IC tag 47 into the flash memory 75 and delete the release key from the IC tag 47 in the first cassette 47 through the data reader/writer 16. Meanwhile, the user may replace the first cassette with a second cassette. Following the processes in S43-S44 (S43, S44: NO), if the second cassette is a new cassette (S45: YES), in S46, the CPU 71 may execute the writing action. Specifically, the CPU 71 may write the release key stored in the flash memory 75 into the IC tag 47 in the second cassette. In S47, the CPU 71 may delete the release key from the flash memory 75 and returns to the first transfer process (see FIG. 5).

Figure 8:
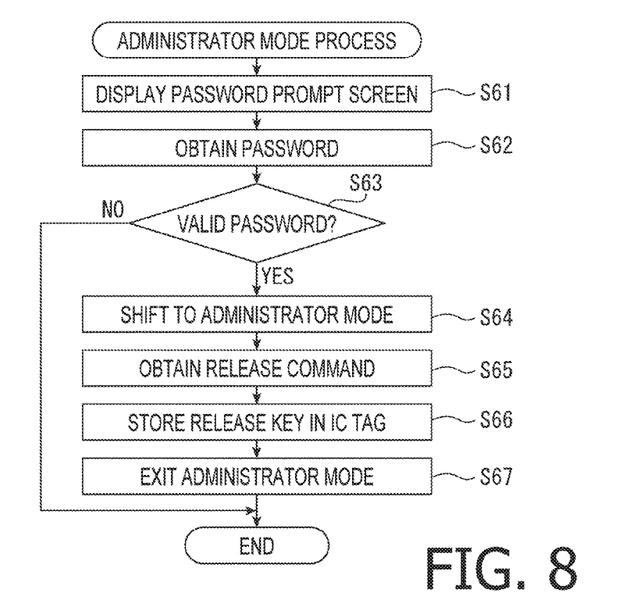
FIG. 8 is a flowchart to illustrate an administrator mode process to be conducted in the printing apparatus according to the second embodiment of the present disclosure.

With reference to FIG. 8, an administrator mode process will be described below. A new cassette to be used in the printing apparatus 1 may not store the release key being the specific data in the IC tag 47; therefore, a user may need to operate the new cassette to store the release key in the IC tag 47 so that the new cassette is enable to be used in the printing apparatus 1. In order to store the release key, which was stored in the IC tag 47 in the first cassette, to the IC tag 47 in the new cassette through the flash memory 75, the user may attach the new cassette to the attachable section 8 without commanding cancellation in S44 (S44: NO). The release key may be stored in the IC tag 47 in the tape cassette 30 when the printing apparatus 1 is in a predetermined administrator mode. For example, the release key may be stored in IC tags 47 in a new cassette so that a plurality of tape cassettes 30 may be enabled to be used in the printing apparatus 1. In order to increase the quantity of the tape cassettes 30 to be used in the printing apparatus 1, a user, e.g., an administrator of the tape cassettes 30, may operate the new cassette in the printing apparatus 1 when the printing apparatus 1 is in the administrator mode. Specifically, prior to activating the administrator mode in the printing apparatus 1, the administrator may attach the tape cassette 30 with the IC tag 47, in which the release key is to be stored. The administrator may operate the keyboard 3 and select the administrator mode so that the CPU 71 may execute the administrator mode process based on a program stored in the flash memory 75.

In S61, the CPU 71 displays a password prompt screen in the display 5. The password prompt screen may contain an image to prompt the user to enter a password, which is required to shift the printing apparatus 1 into the administrator mode. The administrator may enter the password through the keyboard 3. In S62, the CPU 71 obtains the password entered through the keyboard 3. In S63, the CPU 71 determines whether the entered password is valid in comparison with a password that is set in advance. If the entered password is invalid (S63: NO), the CPU 71 ends the administrator mode process without shifting to the administrator mode.

If the obtained password is valid (S63: YES), in S64, the CPU 71 shifts to the administrator mode. In the administrator mode, the administrator may enter a release command, which may manipulate the IC tag 47 in the attached tape cassette 30 to store the release key, through the keyboard 3. In S65, the CPU 71 obtains the release command entered through the keyboard 3. In S66, the CPU 71 stores the release key in the IC tag 47 in the attached tape cassette 30 through the data reader/writer 16. Therefore, the tape cassette 30 may be enabled to be used in the printing apparatus 1, and the printing apparatus 1 may print characters on the tape 50 in the attached tape cassette 30. In S67, the CPU 71 exits the administrator mode and ends the administrator mode process.

As has been described above, the printing apparatus 1 in the second embodiment may transfer the release key being the specific data from the IC tag 47 in the first cassette to the IC tag 47 in the second cassette. Therefore, for example, when the medium remainder is equal to zero, the release key may be transferred from the IC tag 47 in the first cassette, of which medium remainder is zero, to the IC tag 47 in the second cassette being the new cassette. In this regard, for example, the printing apparatus 1 may be restrained from printing characters on the tape 50 in a new cassette until the medium remainder in the tape cassette 30 currently in use is lowered to zero and the administrator transfers the release key in the IC tag 47 in the new cassette. Thus, the printing apparatus 1 may restrain the tape 50 from being wasted.

For example, a user, or an administrator, who knows the password to shift the printing apparatus 1 to the administrator mode may be the only user who has the authority to write the release key in the IC tag 47 in the new cassette. In this regard, a quantity of the tape cassettes 30 that are enabled to be usable in the printing apparatus 1 may be easily manageable.

It is to be understood that the subject matter defined in the appended claims is not necessarily limited to the specific features or acts described above.

Figure 9:
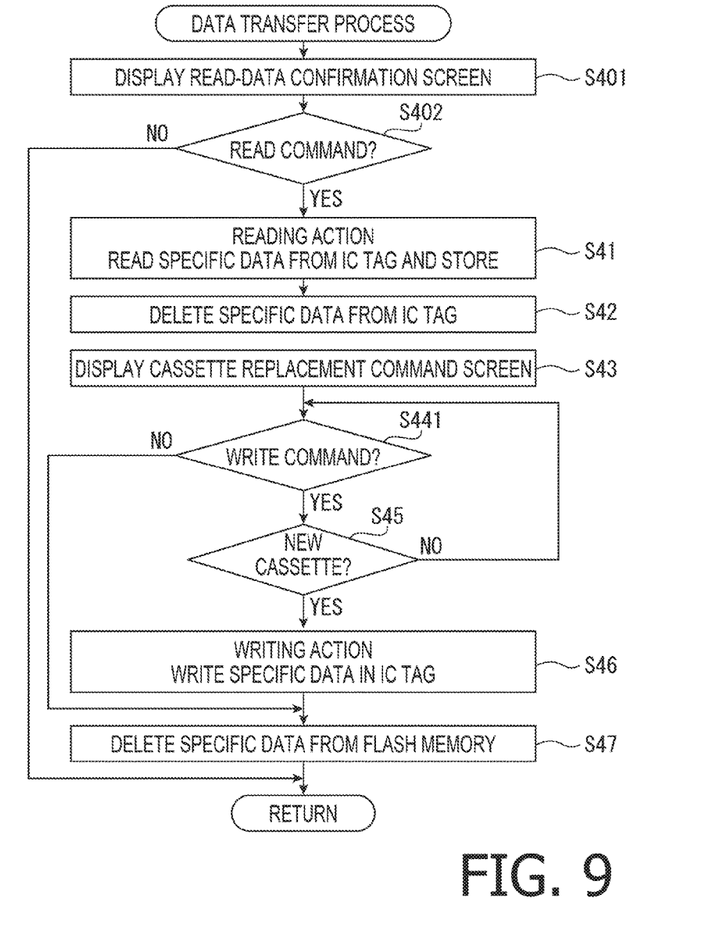
FIG. 9 is a flowchart to illustrate a data transfer process to be conducted in the printing apparatus according to a modified example of the embodiment of the present disclosure.

For example, the data transfer process shown in FIG. 6 may be replaced with a modified data transfer process shown in FIG. 9. The modified data transfer process will be described below with reference to FIG. 9. In particular, steps different from the steps in FIG. 6, which are S401-S402 preceding to S41, and S441 in place of S44, will be described in detail. In the first transfer process (see FIG. 5), in S21, if the end mark is detected (S21: YES), in other words, when the medium remainder in the first cassette is equal to the predetermined amount, e.g., zero, the predetermined steps (S23, S24: YES) are conducted, and in S25, the CPU 71 conducts the data transfer process shown in FIG. 9.

As shown in FIG. 9, in S401, the CPU 71 displays a read-data confirmation screen in the display 5. Through the read-data confirmation screen, the user may operate the keyboard 3 to enter a command to manipulate the CPU 71 to execute the reading action. In the following description, the command to manipulate the CPU 71 to execute the reading action may be referred to as a read command. In S402, the CPU 71 determines whether the read command is entered through the keyboard 3. In S402, for example, the user may not enter the read command if the user prefers that the specific data stored in the IC tag 47 in the first cassette should be transferred to the IC tag 47 in the new cassette later. If no read command is entered (S402: NO), the CPU 71 returns to the first transfer process (see FIG. 5). If the read command is entered (S402: YES), in S41, the CPU 71 executes the reading action.

In S42, the CPU 71 deletes the specific data from the IC tag 47 in the first cassette, and in S43, the CPU 71 displays the cassette replacement command screen. Through the cassette replacement command screen, the user may enter a write command, which is a command to manipulate the CPU 71 to execute the writing action, through the keyboard 3. In S441, the CPU 71 determines whether the write command is entered through the keyboard 3. If no write command is entered (S441: NO), that is, if a cancellation command is entered, in S47, the CPU 71 deletes the specific data from the flash memory 75. If the write command is entered (S441: YES), and in S45, if the second cassette is a new cassette (S45: YES), in S46, the CPU 71 executes the writing action.

Figure 10:
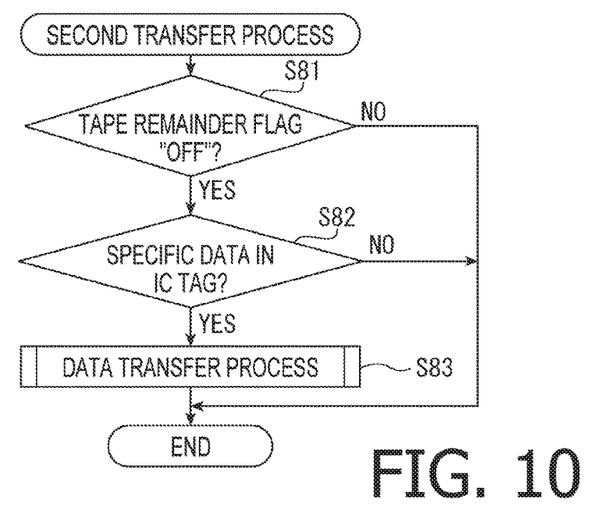
FIG. 10 is a flowchart to illustrate a second transition process to be conducted in the printing apparatus according to the modified example of the embodiment of the present disclosure.

The printing apparatus 1 in the modified example may conduct a second transfer process (see FIG. 10). According to the modified data transfer process (see FIG. 9), following the read-data confirmation screen in S401, in S402, the read command may not necessarily be entered (S402: NO). If no read command is entered, the CPU 71 may return to the first transfer process (see FIG. 6) while the specific data is maintained in the IC tag 47 in the tape cassette 30 and end the first transfer process. According to this flow of steps, the tape cassette 30 is placed in a condition, where the medium remainder is equal to zero, and the specific data is maintained stored in the IC tag 47. The user may attach this tape cassette 30, with the medium remainder being zero and the specific data stored in the IC tag 47, to the attachable section 8. Meanwhile, the CPU 71 may conduct a second transfer process (see FIG. 10) based on a program stored in the flash memory 75 if the in-print flag is "off," and if the IC tag 47 in the attached tape cassette 30 is ready to be read and written through the data reader/writer 16.

As shown in FIG. 10, in S81, the CPU 71 determines whether the tape remainder flag in the IC tag 47 in the attached tape cassette 30 indicates "off" through the data reader/writer 16. In other words, the CPU 71 determines whether the medium remainder in the attached tape cassette 30 is equal to the predetermined amount. If the tape remainder flag is "on" (S81: NO), the CPU 71 ends the second transfer process. If the tape remainder flag is "off" (S81: YES), in S82, the CPU 71 determines whether the specific data is stored in the IC tag 47 in the attached tape cassette 30 through the data reader/writer 16. If no specific data is stored in the IC tag 47 in the attached tape cassette 30 (S82: NO), the CPU 71 ends the second transfer process. If the specific data is stored in the IC tag 47 in the attached tape cassette 30 (S82: YES), in S83, the CPU 71 conducts the modified data transfer process (see FIG. 9). Therefore, the specific data may be transferred from the IC tag 47 in the tape cassette 30, of which medium remainder is zero, to the IC tag 47 in a new cassette. The CPU 71 ends the second transfer process thereafter.

According to the modified example of the printing apparatus 1, when the medium remainder is equal to zero (S21: YES), in S402, whether the read command is entered is determined. When the read command is entered (S402: YES), in S41, the reading action is executed, and the specific data is read from the IC tag 47 in the first cassette and stored in the flash memory 75. The user may replace the first cassette, in which the medium remainder is zero, with a new cassette. When the write command is entered (S441: YES), in S46, the writing action is executed, and the specific data stored in the flash memory 75 is written in the IC tag 47 in the second cassette. Thus, the specific data having been used in the replaced tape cassette 30 may be transferred to be stored in the IC tag 47 in the replacing second cassette. Therefore, while the tape cassette 30 may be replaced with a new cassette when the medium remainder is lowered to zero, the user may continuously use the specific data with the replacing new cassette. Thus, the printing apparatus 1 in the modified example may provide the specific data, which is once stored in the IC tag 47 in the replaced tape cassette 30, to be usable with the replacing tape cassette 30.

According to the printing apparatus 1 in the modified example described above, in S402, prior to reading the specific data from the IC tag 47 in the attached tape cassette 30 in S41, the CPU 71 may determine whether the read command is entered. Therefore, the user may select whether the specific data should be read from the IC tag 47 in the attached tape cassette 30. Thus, the printing apparatus 1 may read the specific data at a preferred timing for the user.

Further, in S441, prior to writing the specific data in the IC tag 47 in the attached tape cassette 30, the CPU 71 may determine whether the write command is entered. Therefore, the user may select whether the specific data should be written to the IC tag 47 in the attached tape cassette 30. Thus, the printing apparatus 1 may restrain the specific data from being written into the IC tag 47 in the tape cassette 30, when the tape cassette 30 is considered to be undesirable for the user to store the specific data.

Although examples of carrying out the invention have been described, those skilled in the art will appreciate that there are numerous variations and permutations of the printing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, determination of the medium remainder being equal to the predetermined amount may not necessarily rely on detection of the end mark printed on the tape 30 based on the intensity of the light detected by the sensor 21. For example, the CPU 71 may store a rotation amount of the tape-feed motor 23 in the flash memory 75 and determine the medium remainder being equal to the predetermined amount based on the rotation amount of the tape-feed motor 23 stored in the flash memory 75.

For another example, the predetermined amount for the medium remainder may not necessarily be none (zero) but may be an amount greater than zero. Meanwhile, it may be preferable that the specific data should be read from the IC tag 47 in the first cassette (S41) when the tape 50 being the printing medium is exhausted; therefore, the predetermined amount may be an amount, by which printing may no longer be conducted (e.g., substantially zero).

For another example, the specific data may not necessarily be limited to the print data including the numbering data or the release key but may include, for example, data indicating a type of the tape cassette 30 (e.g., color, width, etc., of the tape 50), and data indicating print settings (e.g., font, size, color, etc., of the characters). The specific data may not necessarily be limited to a part of the data stored in the IC tag 47 but may be entire data stored in the IC tag 47.

For another example, the printing apparatus 1 may not necessarily be a printer to print characters on the tape 50 in the tape cassette 30 but may be an inkjet printer to print an image in ink stored in an ink cartridge having the IC tag 47. If the printing apparatus 1 is the inkjet printer, the ink cartridge may serve similarly to the tape cassette 30, and the ink stored in the ink cartridge may serve similarly to the tape 50 as the printing medium. For another example, the printing apparatus 1 may print characters on a ribbon stored in a ribbon cassette having the IC tag 47. The ribbon cassette may serve similarly to the tape cassette 30, and the ink ribbon may serve similarly to the tape 50 as the printing medium.

For another example, the CPU 71 may be replaced with a microcomputer, an application specific integrated circuits (ASIC), or a field programmable gate array (FPGA). For another example, the processes in the embodiments described above executable by the CPU 71 may not necessarily be executed by the single processor but may be shared by multiple processors. The ROM 72 or the flash memory 75 may not necessarily include a transitory memory medium (e.g., transmittable signals). The programs may be downloaded in the form of transmittable signals from a server which is connected with a network and stored in the flash memory 75. The programs to be transmitted in the form of signals may be stored in a non-transitory memory medium such as a hard disk drive (HDD) provided in the server.

What is claimed is:

1. A printing apparatus, comprising:
    a cassette configured to store a printing medium therein, the cassette comprising a first-typed memory device, the first-typed memory device being configured to store data therein;
    an attachable section, to which the cassette is detachably attachable;
    a printer configured to print an image in conjunction with the cassette attached to the attachable section; and
    a controller configured to:
        determine whether a medium remainder indicating a remaining amount of the printing medium in a first cassette is equal to a predetermined amount, the first cassette being the cassette attached to the attachable section and having been used for printing in conjunction with the printer;
        based on a determination that the medium remainder in the first cassette is equal to the predetermined amount, execute a reading action to read specific data from the first-typed memory device in the first cassette and store the specific data in a second-typed memory device, the second-typed memory device being configured to store data therein;
        after reading the specific data from the first-typed memory device in the first cassette, delete the specific data from the first-typed memory device in the first cassette;
        after execution of the reading action, determine whether a second cassette being another cassette attached to the attachable section after the execution of the reading action is a new cassette, in which the medium remainder is greater than the predetermined amount and in which the specific data is not stored in the first-typed memory device; and
        based on a determination that the second cassette is the new cassette, execute a writing action to write the specific data stored in the second-typed memory device into the first-typed memory device in the second cassette.

2. The printing apparatus according to claim 1, wherein the controller is configured to delete the specific data from the second-typed memory device after writing the specific data stored in the second-typed memory device into the first-typed memory device in the second cassette.

3. The printing apparatus according to claim 1, wherein the printing medium includes a tape to print the image in conjunction with the printer; and
    wherein the cassette comprises a cassette casing configured to accommodate the tape therein.

4. The printing apparatus according to claim 1, wherein the predetermined amount is zero.

5. A printing apparatus, comprising:
    a cassette configured to store a printing medium therein, the cassette comprising a first-typed memory device, the first-typed memory device being configured to store data therein;
    an attachable section, to which the cassette is detachably attachable;
    a printer configured to print an image in conjunction with the cassette attached to the attachable section; and
    a controller configured to:
        determine whether a medium remainder indicating a remaining amount of the printing medium in a first cassette is equal to a predetermined amount, the first cassette being the cassette attached to the attachable section and having been used for printing in conjunction with the printer;
        based on a determination that the medium remainder is equal to the predetermined amount, determine whether the controller received a read command, the read command being a command to the controller to execute a reading action to read specific data from the first-typed memory device in the first cassette and store the specific data in a second-typed memory device, the second-typed memory device being configured to store data therein;
        based on a determination that the controller received the read command, execute the reading action;
        after reading the specific data from the first-typed memory device in the first cassette, delete the specific data from the first-typed memory device in the first cassette;

after execution of the reading action, determine whether the controller received a write command, the write command being a command to the controller to execute a writing action to write the specific data stored in the second-typed memory device into the first-typed memory device in a second cassette, the second cassette being another cassette attached to the attachable section after the execution of the reading action; and based on a determination that the controller received the write command, execute the writing action.

6. The printing apparatus according to claim 5, wherein the controller is configured to delete the specific data from the second-typed memory device after writing the specific data stored in the second-typed memory device into the first-typed memory device in the second cassette.

7. The printing apparatus according to claim 5, wherein the printing medium includes a tape to print the image in conjunction with the printer; and wherein the cassette comprises a cassette casing configured to accommodate the tape therein.

8. The printing apparatus according to claim 5, wherein the predetermined amount is zero.

9. A printing apparatus, comprising:

an attachable section, to which a cassette configured to store a printing medium therein and comprising a first-typed memory device is attachable, the first-typed memory device being configured to store data;

a printer configured to print an image in conjunction with the cassette attached to the attachable section; and a controller configured to:
   determine whether a medium remainder indicating a remaining amount of the printing medium in a first cassette is equal to a predetermined amount, the first cassette being the cassette attached to the attachable section and having been used for printing in conjunction with the printer;

based on a determination that the medium remainder in the first cassette is equal to the predetermined amount, execute a reading action to read specific data from the first-typed memory device in the first cassette and store the specific data in a second-typed memory device, the second-typed memory device being configured to store data therein;

after reading the specific data from the first-typed memory device in the first cassette, delete the specific data from the first-typed memory device in the first cassette;

after execution of the reading action, determine whether a second cassette being another cassette attached to the attachable section after the execution of the reading action is a new cassette, in which the medium remainder is greater than the predetermined amount and in which the specific data is not stored in the first-typed memory device; and based on a determination that the second cassette is the new cassette, execute a writing action to write the specific data stored in the second-typed memory device to the first-typed memory device in the second cassette.

10. A printing apparatus, comprising:

an attachable section, to which a cassette configured to store a printing medium therein and comprising a first-typed memory device is attachable, the first-typed memory device being configured to store data;

a printer configured to print an image in conjunction with the cassette attached to the attachable section; and a controller configured to:
   determine whether a medium remainder indicating a remaining amount of the printing medium in a first cassette is equal to a predetermined amount, the first cassette being the cassette attached to the attachable section and having been used for printing in conjunction with the printer;

based on a determination that the medium remainder is equal to the predetermined amount, determine whether the controller received a read command, the read command being a command to the controller to execute a reading action to read specific data from the first-typed memory device in the first cassette and store the specific data in a second-typed memory device, the second-typed memory device being configured to store data therein;

based on a determination that the controller received the read command, execute the reading action;

after reading the specific data from the first-typed memory device in the first cassette, delete the specific data from the first-typed memory device in the first cassette;

after execution of the reading action, determine whether the controller received a write command, the write command being a command to the controller to execute a writing action to write the specific data stored in the second-typed memory device into the first-typed memory device in a second cassette, the second cassette being another cassette attached to the attachable section after the execution of the reading action; and based on a determination that the controller received the write command, execute the writing action.

* * * * *